United States Patent
Kutchuk et al.

(10) Patent No.: US 9,141,509 B2
(45) Date of Patent: Sep. 22, 2015

(54) MOBILE DEVICE REMOTE CONTROL SESSION ACTIVITY PATTERN RECOGNITION

(71) Applicant: AetherPal Inc., South Plainfield, NJ (US)

(72) Inventors: Artun Kutchuk, La Jolla, CA (US); Ranjithkumar Palanichamy, Piscataway, NJ (US); Calvin Charles, Piscataway, NJ (US)

(73) Assignee: AetherPal Inc., South Plainfield, NJ (US)

( * ) Notice: Subject to any disclaimer, the term of this patent is extended or adjusted under 35 U.S.C. 154(b) by 372 days.

(21) Appl. No.: 13/841,877

(22) Filed: Mar. 15, 2013

(65) Prior Publication Data
US 2013/0262935 A1 Oct. 3, 2013

Related U.S. Application Data

(60) Provisional application No. 61/617,835, filed on Mar. 30, 2012.

(51) Int. Cl.
| | | |
|---|---|---|
| *G06F 11/00* | (2006.01) | |
| *G06F 11/34* | (2006.01) | |
| *H04L 29/08* | (2006.01) | |

(52) U.S. Cl.
CPC ............ *G06F 11/3438* (2013.01); *H04L 29/08* (2013.01); *H04L 67/22* (2013.01)

(58) Field of Classification Search
USPC ................................. 714/27, 25, 2
See application file for complete search history.

(56) References Cited

U.S. PATENT DOCUMENTS

| | | |
|---|---|---|
| 5,995,829 A | 11/1999 | Broderick |
| 5,999,521 A | 12/1999 | Thompson |
| 6,047,071 A | 4/2000 | Shah |
| 6,144,849 A | 11/2000 | Nodoushani et al. |
| 6,148,197 A | 11/2000 | Bridges et al. |
| 6,201,964 B1 | 3/2001 | Tung et al. |
| 6,378,088 B1 | 4/2002 | Mongan |
| 6,516,188 B1 | 2/2003 | New et al. |
| 6,564,055 B1 | 5/2003 | Hronek |
| 6,615,038 B1 | 9/2003 | Moles et al. |
| 6,625,451 B1 | 9/2003 | LaMedica, Jr. et al. |
| 6,684,359 B2 | 1/2004 | Noy |
| 6,832,373 B2 | 12/2004 | O'Neill |

(Continued)

FOREIGN PATENT DOCUMENTS

| | | |
|---|---|---|
| EP | 1429569 | 12/2003 |
| WO | WO2005001665 | 1/2005 |

OTHER PUBLICATIONS

Anonymous, "SyncML notification initiated session", Internet Citation, XP002462105, URL:http://www.openmobilealliance.org/tech/affiliates/syncml/syncml_dm_notification_v11_20020215.pdf, (Dec. 12, 2007).

(Continued)

*Primary Examiner* — Sarai Butler
(74) *Attorney, Agent, or Firm* — Volpe and Koenig, P.C.

(57) ABSTRACT

Disclosed is a method of updating Care knowledgebase for specific device models with identification of common device problem types and possible corrective actions for specific mobile device models based on the actions performed by the CSR remotely on the device or by the end user on the device during remote control session.

26 Claims, 7 Drawing Sheets

(56) References Cited

U.S. PATENT DOCUMENTS

| | | | |
|---|---|---|---|
| 6,907,546 B1 | 6/2005 | Haswell et al. | |
| 6,925,405 B2 | 8/2005 | Adir et al. | |
| 6,959,433 B1 | 10/2005 | Morales, Jr. et al. | |
| 6,970,719 B1 | 11/2005 | McConnell et al. | |
| 7,032,212 B2 | 4/2006 | Amir et al. | |
| 7,194,264 B2 | 3/2007 | Li et al. | |
| 7,286,802 B2 | 10/2007 | Beyme et al. | |
| 7,805,719 B2 | 9/2010 | O'Neill | |
| 8,594,304 B2 * | 11/2013 | Werth et al. | 379/265.05 |
| 2003/0065738 A1 | 4/2003 | Yang et al. | |
| 2003/0066065 A1 | 4/2003 | Larkin | |
| 2003/0101246 A1 | 5/2003 | Lahti | |
| 2003/0156549 A1 | 8/2003 | Binder et al. | |
| 2003/0204726 A1 | 10/2003 | Kefford et al. | |
| 2004/0098715 A1 | 5/2004 | Aghera et al. | |
| 2005/0193098 A1 | 9/2005 | Khandpur et al. | |
| 2005/0227688 A1 | 10/2005 | Li et al. | |
| 2006/0015404 A1 | 1/2006 | Tran | |
| 2006/0015626 A1 | 1/2006 | Hallamaa et al. | |
| 2006/0075284 A1 | 4/2006 | Skan | |
| 2006/0130046 A1 | 6/2006 | O'Neill | |
| 2006/0136922 A1 | 6/2006 | Zimberg et al. | |
| 2006/0248522 A1 | 11/2006 | Lakshminarayanan et al. | |
| 2007/0005647 A1 | 1/2007 | Cugi et al. | |
| 2007/0106564 A1 | 5/2007 | Matotek et al. | |
| 2007/0299940 A1 | 12/2007 | Gbadegesin et al. | |
| 2008/0098380 A1 | 4/2008 | Klusmeyer | |
| 2008/0172736 A1 | 7/2008 | Barr et al. | |
| 2008/0209193 A1 | 8/2008 | Zhang et al. | |
| 2009/0164602 A1 | 6/2009 | Kies et al. | |
| 2009/0177882 A1 | 7/2009 | Saran et al. | |
| 2009/0221307 A1 | 9/2009 | Wolak et al. | |
| 2009/0228966 A1 | 9/2009 | Parfene et al. | |
| 2010/0070649 A1 | 3/2010 | Ng | |
| 2010/0151823 A1 | 6/2010 | Dagorn et al. | |
| 2010/0217780 A1 | 8/2010 | Erola et al. | |
| 2013/0054969 A1 | 2/2013 | Charles et al. | |
| 2013/0198827 A1 * | 8/2013 | Bhaskaran et al. | 726/7 |

OTHER PUBLICATIONS

Kovacs, E. et al, "Integrating mobile agents into the mobile middleware", Internet article: http://download.springer.com/static/pdf/630/art%253A10.1007%252FBF01324936.pdf?auth66=1353975026_642152af85f26d0903f4dc786bdf1416&ext=.pdf>, p. 68-74, (Retrieved from Internet Nov. 26, 2012).

Caporuscio, M. et al, "Design and evaluation of a support service for mobile, wireless publish subscribe applications", 2003 IEEE, Internet article: http:ieeexplore.ieee.org/stamp/stamp.jsp?tp=&arnumber=1265521, 29:12, p. 1059-1071, (Retrieved from Internet Nov. 26, 2012).

\* cited by examiner

MOBILE DEVICE REMOTE CONTROL SESSION ACTIVITY PATTERN RECOGNITION

PRIORITY CLAIM

In accordance with 37 C.F.R. §1.76, a claim of priority is included in an Application Data Sheet filed concurrently herewith. Accordingly, the present invention claims priority under 35 U.S.C. §§119(e), 120, 121, and/or 365(c) to U.S. Provisional Patent Application No. 61/617,835, entitled "MOBILE DEVICE REMOTE CONTROL SESSION ACTIVITY PATTERN RECOGNITION", filed on Mar. 30, 2012. The contents of which the above referenced application is incorporated herein by reference in its entirety.

FIELD OF THE INVENTION

The present invention relates to mobile wireless communication devices, systems, networks, methods of operation, customer care systems and knowledgebase and in particular to a mobile device remote control session activity pattern recognition and update of knowledgebase with common issues and resolutions.

BACKGROUND OF THE INVENTION

Traditionally the mobile user customer care is handled manually by the Customer Care Representative (CSR) requesting the end user to take specific actions on the device and user informing the CSR with the results observed on the device. In some instances the end user informs the CSR the actions being performed on the device and the CSR assessing the next steps based on the results observed according to predefined scripts that are defined in the customer care knowledgebase. This process is lengthy, error prone, dissatisfying to the end user and costly to the Care organization providing the service.

The introduction of remote control of the mobile devices by the Customer Support Representative (CSR) has already improved the above described situation by allowing the CSR to observe the behaviors on the devices as well control the device to take corrective actions. The call handling and resolution time can be further reduced by taking advantage from previous remote sessions and the results obtained.

SUMMARY OF THE INVENTION

This invention describes the method of updating Care knowledgebase for specific device models with identification of common device problem types and possible corrective actions for specific mobile device models based on the actions performed by the CSR remotely on the device or by the end user on the device during remote control session (A remote control session is where a CSR is able to connect to a user mobile device remotely and control the device to trouble shoot a problem, or observe the activities on the device), and results obtained.

Thus, it is an objective of this invention to identify common problems the mobile users are having and actively updating the knowledgebase with solution so future care calls are resolved to the customers' satisfaction.

Another objective of this invention is to reduce the customer care call handling time and cost.

Still another objective of this invention is to catalog common customer care mobile device remote control activity patterns.

Still another objective of this invention is to match the above activity patterns to recommended solutions during remote care session.

Still another objective is to recognize the results of the actions performed during the remote control session to compare to the knowledgebase.

Still another objective of this invention is to enable device development teams to improve product design that minimize the common problems observed by the users.

Still another objective of the invention is to improve end customer satisfaction and brand loyalty.

Other objectives and advantages of this invention will become apparent from the following description taken in conjunction with any accompanying drawings wherein are set forth, by way of illustration and example, certain embodiments of this invention. Any drawings contained herein constitute apart of this specification and include exemplary embodiments of the present invention and illustrate various objects and features thereof.

DETAILED DESCRIPTION OF THE PREFERRED EMBODIMENT

Figure 1:
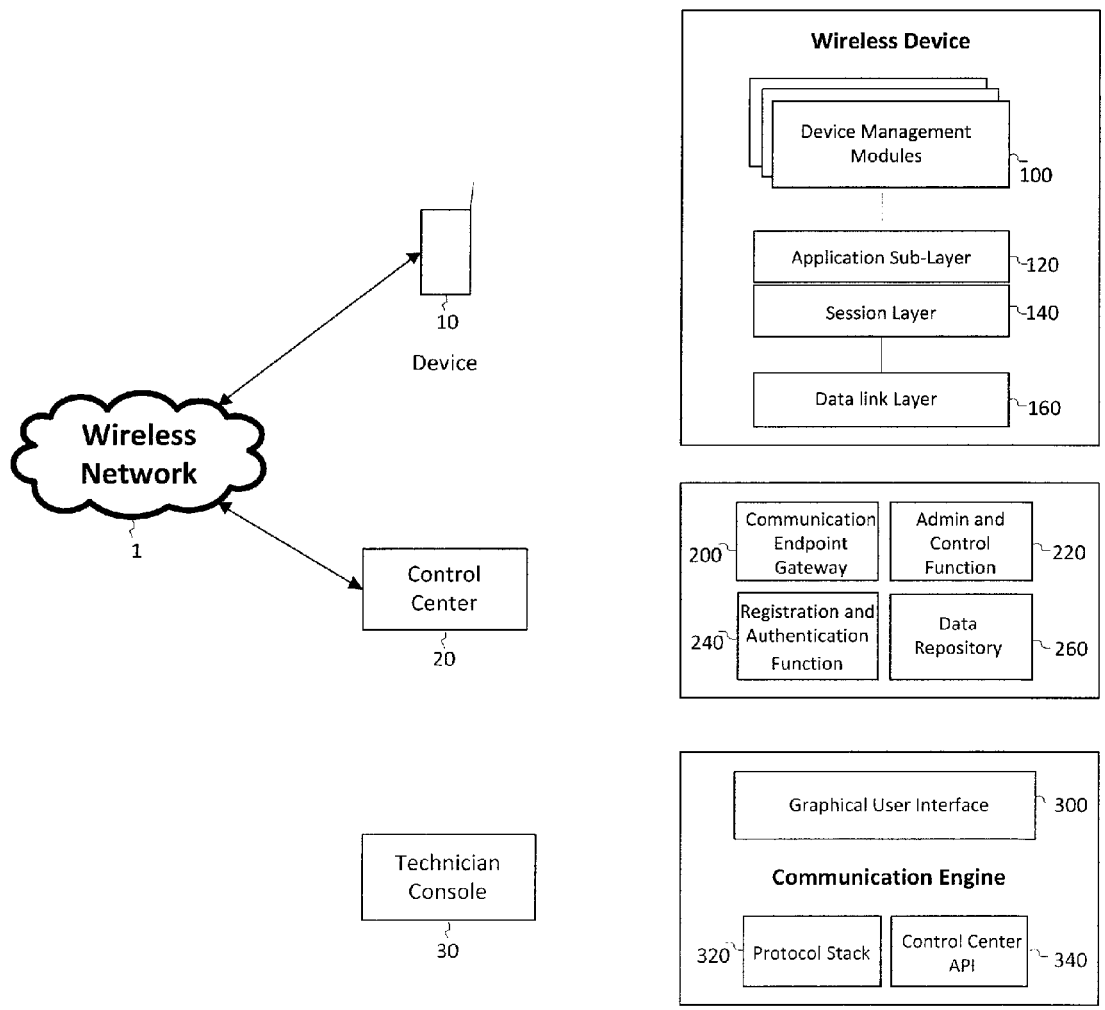
FIG. 1 illustrates the overall architecture of the Virtual Mobile Management (VMM) system.

Referring to FIG. 1, set forth is the overall architecture of the Virtual Mobile Management (VMM) system. For the purpose of readability, Blocks number starting with 1xx relates to Device [10] and it components; 2xx under refer to Control Center [20] and its components; 3xx under relate to Technician Console [30] and its components.

The Virtual Mobile Management Remote Control (VMM-RC) is a powerful tool designed to be used by the customer care representatives to remotely view and control the mobile devices. In a preferred embodiment, the key components of the VMM-RC system include: Technician Console [30] where care agents interact with the remote devices [10] through Control Center [20] services that mediate communication between the Technician Console [30] and the remote devices [10].

The Control Center [20] comprises the following elements:
Communication Endpoint Gateway or CEG [200]
Admin and Control Function or ACF [220]
Registration and Authentication Function or RAF [240]
Data Repository [260]

The primary responsibility of CEG [200] is to manage and mediate sessions. The server provides communication endpoints between device [10] and Technician Console [30]. This allows for multiple requests to be serviced within one session from multiple instances of [30]. The CEG or [200] provides a consistent manner of device connection and Tool service in a system with heterogeneous devices running different operating systems. The CEG or [200] provides load balancing across multiple Connection Handlers on each Communication End Point Gateway Server in order to minimize single point of failure.

Figure 2:
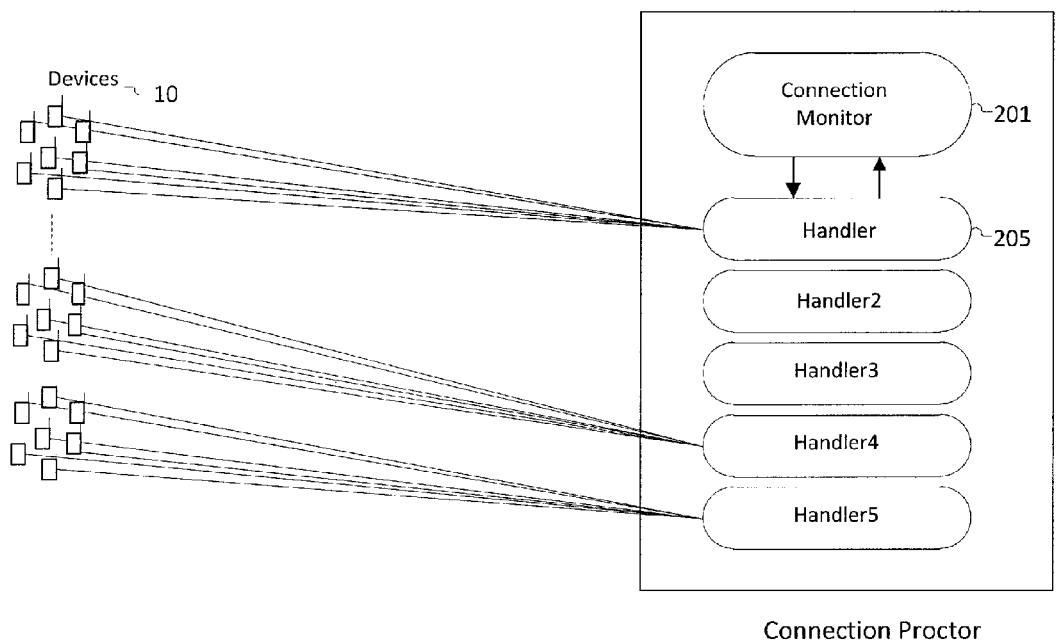
FIG. 2 illustrates the details of Communication Endpoint Gateway.

FIG. 2, shows components of CEG [200] in detail. CEG [200] is comprised of two components; the Connection Monitor [201] and the Connection Handler [205].

The primary function of [201] is: Create and manage multiple instances of [205]; Creates Session ID for new connection requests; Monitors all the scheduled and existing sessions. The primary function of [205] is: authenticate inbound connections; mediate VMM session traffic between device [10] and Technician Console [30].

Figure 3:
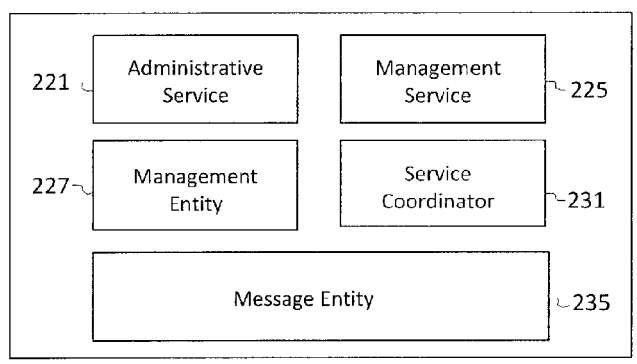
FIG. 3 illustrates the details of Admin and Control Function.

FIG. 3 shows the details of ACF [220] which is responsible in the administration, management and authorization of communication between the Control Center [20] and the devices [10]. It comprises of the following service functions:

The Administrative Service [221] is designed to be a central administrative entity of the entire virtual mobile management system. Through this service, system administrators perform administration, management and instrumentation servers within the system, create and maintain multiple tenants, assign tenant administrator roles, etc.

The Management Service [225] provides the operational endpoint to the system. The primary functions of Management Service are: Load distribution among the CEG, management of device registration; Administration of devices; Administration of users, zones, policies, roles, etc.; and Session Queuing.

The Management Entity [227] component is responsible in providing the Management service [225] with an in-memory data store for key operational data such as ACL, user/group/zone structures, etc.

The Service Coordinator [231] coordinates the communication between various elements within the System. It provides the database interface to the RAF [240] in the Control Center. All services register themselves with this service. This service is responsible for service discovery.

Figure 4:
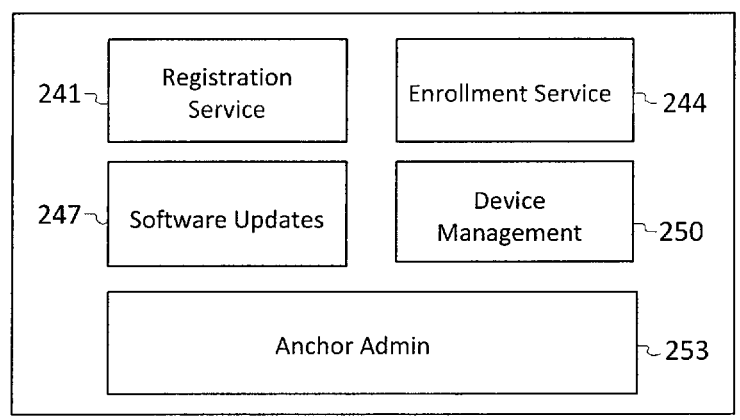
FIG. 4 illustrates the details of Routing and Authentication Function.

FIG. 4 shows the components of RAF [240] in detail; RAF [240] provides a single point of entry for all devices for enrollment and authentication services during VMM-RC session. It comprises of the following components:

Registration Service [241]: During Auto-Enrollment, devices are required to register themselves with this service, prior to enrolling themselves.

Enrollment Service [244]: This service is responsible to enroll registered devices with the system. The Enrollment process is defined in detail in the later sections of the document.

Software Updates [247]: This service manages the various client packages in the system. Devices connect to this service to request for client update. If an update is available, the service will provide the appropriate client download link.

Device Management [250]: This service provides the enrolled devices an interface to update its parameters in the system such as MDN when the device detects a change. Anchor Admin [253]: This service provides the administration component.

Data Repository [260] is the data warehouse that stores the information about the VMM-RC Mobile devices, server configuration, tasks and status settings. These data bases are pivotal to configure and update managed devices and server components. It is also responsible to maintain the user login information as well as device authentication information.

Figure 5:
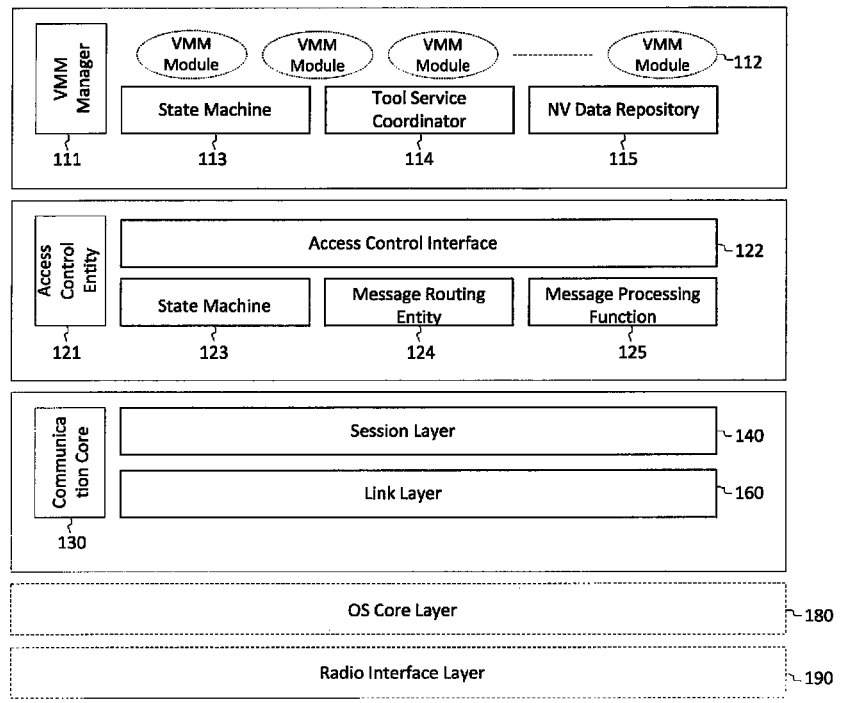
FIG. 5 illustrates the VMM client protocol architecture of Device.

FIG. 5 illustrates the VMM client protocol architecture of Device [10]. The VMM Client architecture comprises of the following protocol layers and function blocks VMM Manager [111] this layer encapsulates functional entities that provide the communication and protocol frameworks necessary to client services. This layer primarily handles bearer plane traffic. The following functional entities are part of [111].

VMM Modules [112] provide a multitude of tool services. Tool Services are grouped together that exhibit common functionality such as Remote Control, File Manager, Device Management, etc.

State Machine [113], each tool service maintains an instance of the state machine. A State Machine defines a set of shared states that the tool service on the device application shares with the server.

Tool Service Coordinator [114] maintains a collection of active tool service instances that are currently being serviced by the VMM application. This entity maintains the lifetime of all Tool Services, and is responsible in creating and destroying Tool Services.

NV Data Repository [115] authentication and authorization specific data that is shared between the VMM application and the server is maintained within the NV data repository. This data repository also serves the purpose of maintaining Tool Service configuration as well as VMM configuration data.

Access Control Entity [121] layer provides a set of functions to the Tool Services to communicate with the Control Center [20]. It provides in the encapsulation of messages before forwarding it to the Communication Core [130]. This layer is responsible to invoke an instance of the Communication Core [130] layer and provides a state machine [123] that defines the state of the VMM application.

Access Control Interface [122] provides a set of standard Application Programmer Interface or API to the Tool Services. These APIs provide a consistent communication platform to facilitate both synchronous as well as asynchronous communication.

State Machine [123] identifies the overall state of the VMM application. State transitions within the ACE State Machine triggers events that are handled by the VMM layer. The states are Open and Closed. Traffic flows through the ACI layer only in the State Open.

Message Routing Entity [124] is responsible for routing all signal messages, destined to Tool Services to the respective event handlers.

Message Processing Function [125] is a signal message pre-processor. This entity receives signal messages from the Session Layer destined towards Tool Services. It de-frames these messages prior to forwarding it to the Message Routing Entity to apply routing rules. Messages that are destined for the server from Tool Services are encapsulated here.

Communication Core [130] Layer is responsible to set up and maintain a dedicated communication channel with the Control Center [20]. This layer provides the necessary framework to transport messages between the upper layers and the Control Center [20]. It provides message encapsulation, framing, fragmentation and packet re-construction of Tool Service messages.

Figure 6:
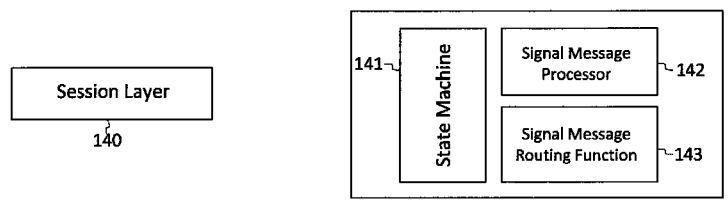
FIG. 6 illustrates the details of VMM Client Session Layer.

The communication core [130] comprises of the following sub-layers. FIG. 6 is a detail of Session Layer [140]. The session layer maintains a set of shared state between the Communication Endpoint Gateway (CEG) [200] and the VMM Application Module [112]. The session layer packets encapsulate signal messages that are transported between the CEG [200] and the VMM Module [112]. Each message within the session layer packet defines the source and destination to which the signal messages are to be delivered. The session layer consists of the following entities.

State Machine [141] maintains a state within a predefined set of shared state between the application and the CEG [200]. State changes within the state machine trigger the execution of state transition procedures within the VMM Application Module [112].

Signal Message Processor [142] is responsible to encapsulate and process signal messages that are transmitted between the CEG [200] and the Application Module [112]. This entity is also responsible in influencing the state transition within the state machine by altering its state. Signal messages destined to VMM modules are forwarded to the Signal Message Routing Function.

Signal Message Routing Function [143] is responsible with the task of forwarding signal messages to the appropriate destination. Signal messages destined to VMM modules are directly forwarded to the VVM Tool Service Coordinator [114]. Signal messages destined to the CEG [200] are forwarded to the link layer [160].

Referring to FIG. 5, another component is the Link Layer [160] which is responsible to establish and maintain a dedicated communication channel between the client and the CEG [200]. The Link Layer encapsulates all messages within its frame prior to forwarding it to the network. Packets that are received by the Link Layer from the network are re-constructed and de-framed prior to forwarding it to the upper layer. This layer checks for message integrity.

Figure 7:
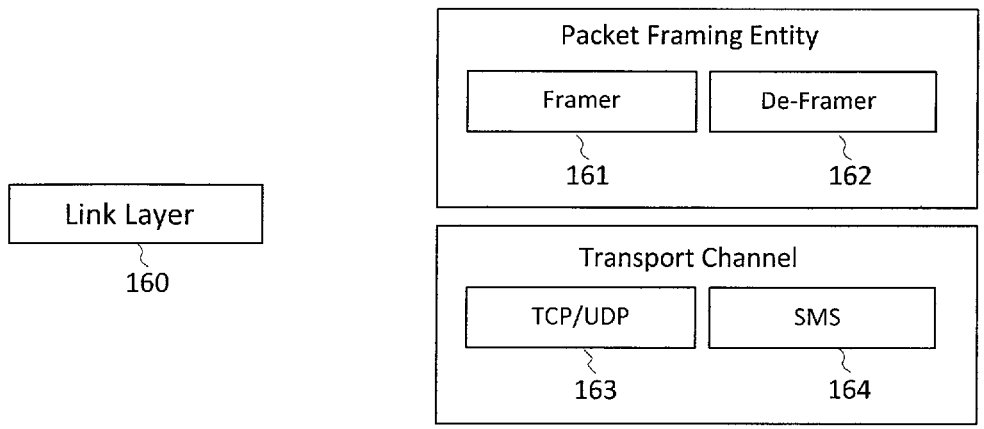
FIG. 7 illustrates the details of the VMM Client Link Layer.

The following components form the Link Layer [160] as in FIG. 7, (Detail of Link Layer in FIG. 5). The Packet Framing Entity [161,162] is responsible to encapsulate messages in Link Layer frames. These frames are then forwarded to the Transport Channel, to be forwarded to the network layer. The packet framing entity comprises of Framer [161] and the De-Framer [162]. When a network packet is received by the Packet Framing Entity, it inspects the packet and verifies the integrity of the packet. Malformed packets are silently discarded.

The Transport Channel [163,164] binds to the appropriate transport layer of the underlying operating system, which is dependent upon the VMM Tool Service. It is responsible to forward messages to the network layer and receives messages from the network layer. It provides notification to the upper layer of the state of the network layer through asynchronous events.

Figure 8:
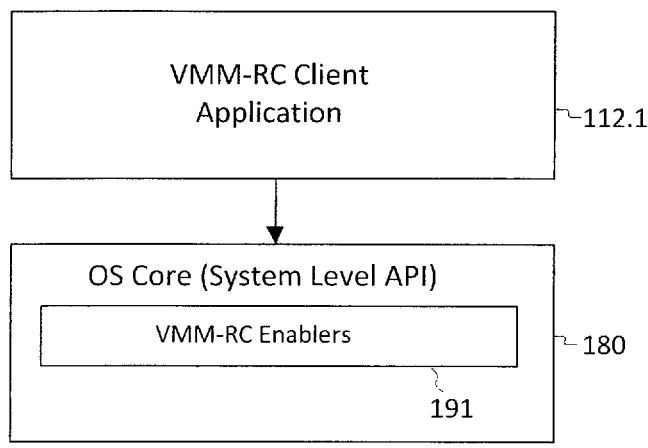
FIG. 8 is a schematic diagram of Virtual Mobile Management-Remote Control VMM-RC on Client side.

FIG. 8 shows is a schematic diagram of Virtual Mobile Management-Remote Control VMM-RC on Client side. The VMM-RC client Application [112.1] on the device provides Core Tool services, to manage the remote control session, collect the desired device diagnostics, provide self-care support for remote session activation and manage security protocol. The VMM-RC client application module [112.1] is one of the many VMM Client Application modules of [112]

The key features that are required by VMM-RC application to manage devices remotely include: Display Capture, this method involves the capturing of the device screen; Key event Injection, this method involves the injection of key events into the device screen; Touch event injection, this method involves the simulation of touch events on the device screen; and Device Information, getting the device information like network, power status, MNC, MCC, IMEI, IMSI, ESN, battery level of the smart phone etc., this is of value to the remote technician.

The VMM-RC Enabler [191] performs the key functions: Intercepts all the SMS; keeps the VMM-RC Application to its current version; if the VMM-RC Application is removed accidentally the VMM-RC Enabler shall connect to the server and download the application and installs the same.

Figure 9:
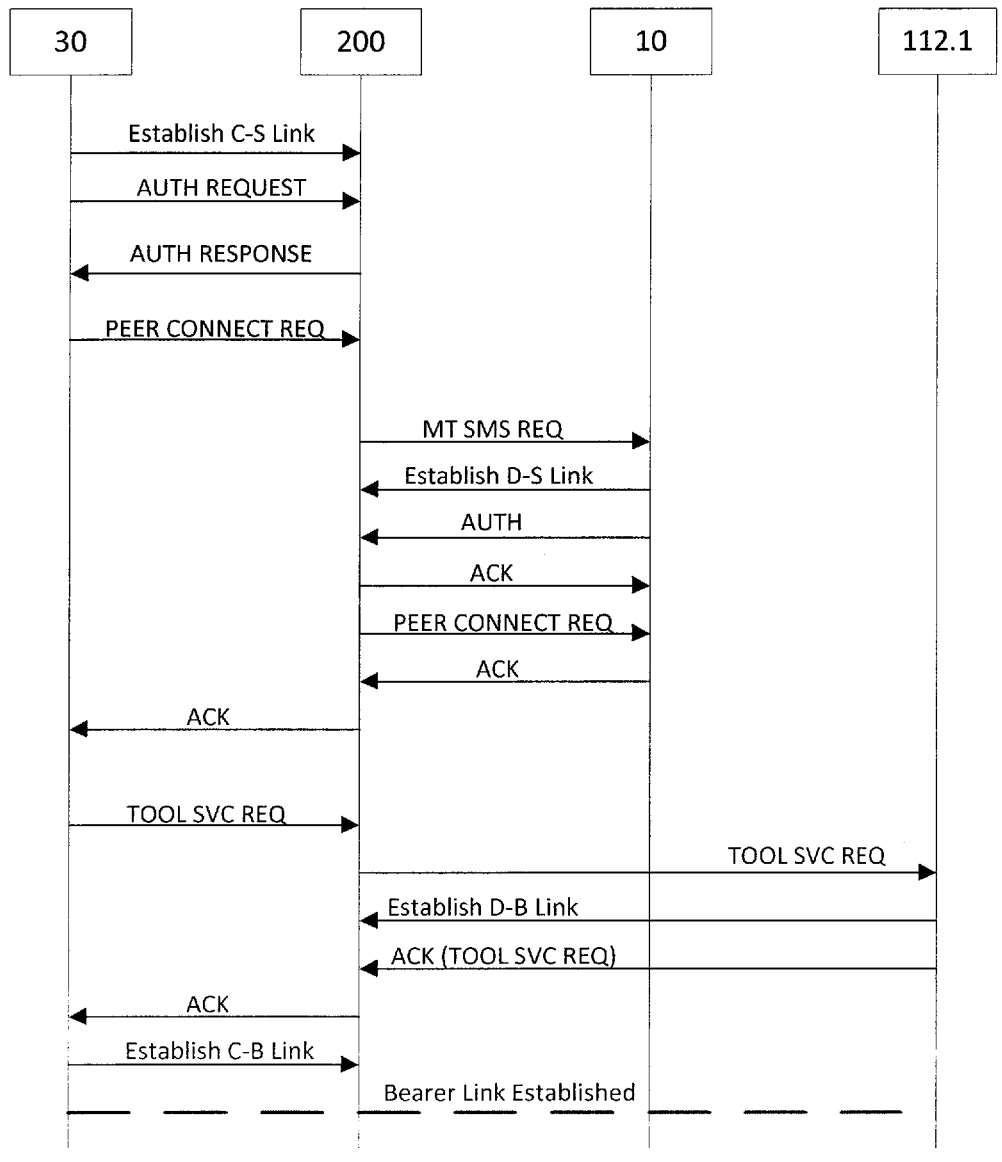
FIG. 9 illustrates the overall process of End-to-End VMM-RC Session establishment.

FIG. 9 illustrates the overall process of End-to-End VMM-RC Session establishment.

(a) CEG [200] receives C-S link connection request from Technician Console [30];

(b) Authentication Request is received by CEG [200] from the Technician Console [30];

(c) Authentication Response is sent by [200] to [30];

(d) PEER_CONNECT_REQ signal is received by [200] from [30];

(e) [200] sends a Mobile Terminated SMS to Device [10];

(f) [200] receives D-S link connection request from Device [10];

(g) Authentication Request is received by [200] from Device [10];

(h) Authentication Response is sent by [200] to Device [10];

(i) PEER_CONNECT_REQ signal sent by [200] to Device [10];

(j) ACK received by [200] from [10];

(k) ACK transmitted by [200] to Technician Console [30];

(l) TOOL_SVC_REQ received by [200] from [30];

(m) TOOL_SVC_REQ relayed by [200] to VMM RC [112.1];

(n) [200] receives D-B link connection from [112.1];

(o) [200] receives ACK from [112.1] for the TOOL_SVC_REQ for step (m);

(p) ACK relayed by [200] to [30];

(q) [200] receives C-B link connection request from [30].

At this point, the control plane and bearer plane is/are established. VMM-RC bearer data is carried over the bearer channels (D-B and C-B)

Figure 10:
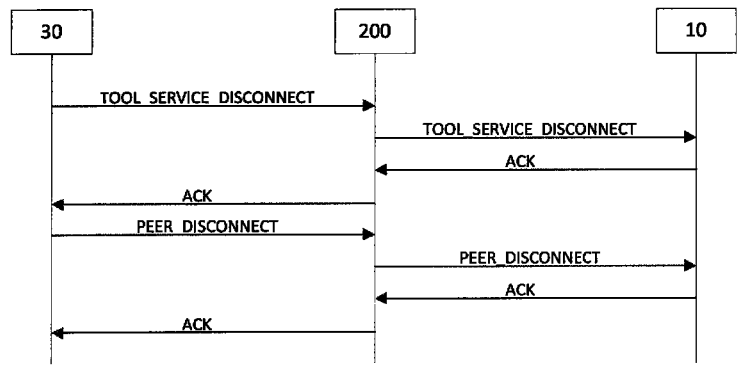
FIG. 10 illustrates the overall process of VMM-RC Session termination.

VMM-Remote Session Termination, referring to FIG. 10, the Technician, operating the Technician Console [30] initiates the VMM-RC service disconnection. The following sequence of events occurs:

(a) TOOL_SVC_DISCONNECT is received from Technician Console [30] by CEG [200];

(b) TOOL_SVC_DISCONNECT is relayed by [200] to Device [10];

(c) ACK is received by [200] from [10];

(d) ACK is relayed by [200] to Technician Console [30];

(e) PEER_DISCONNECT is received from Technician Console [30] by CEG [30];

(f) PEER_DISCONNECT is relayed by [200] to Device [10];

(g) ACK is received by [200] from [10]; and (h) ACK is relayed by [200] to Technician Console [30].

At this time, all channels are disconnected and the VMM-RC session is closed.

Figure 11:
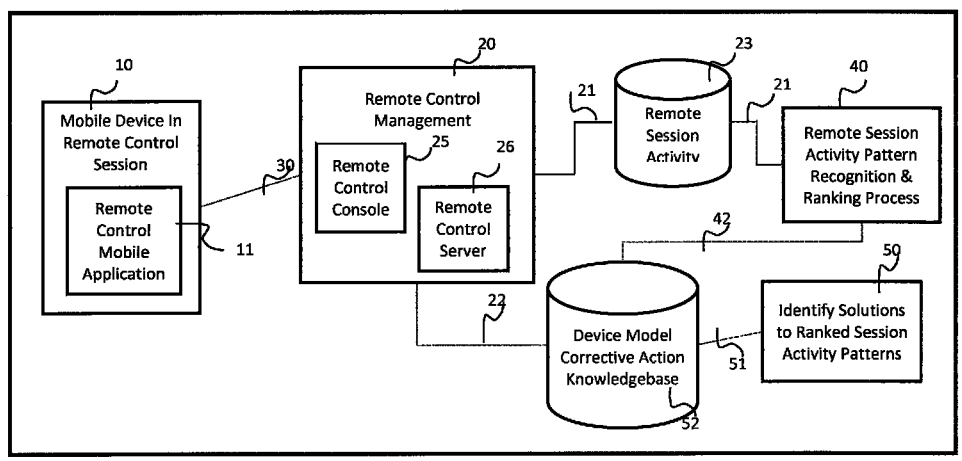
FIG. 11 is a schematic of a remote control session activity pattern.

FIG. 11 is a schematic of a remote control session activity pattern. The focus of this invention is to take advantage of the mobile devices that are remotely connected to the care system and are in a remote control session. During the session all the actions taken (e.g. menu selection, swipe, key board entry, application execution, etc.) by the CSR on the device that are sent to the remotely connected device from the Remote Control Server and actions taken by the user on the device sent back to the Remote Control Server are recorded on the server. This information during the remote session is maintained in memory on Remote Control Management 20 and at the end of the remote session the recoding is saved in the Remote Session storage 23. Typically these actions are taken to replicate and troubleshoot the specific issue that the end user is calling the Customer Care about.

The recorded information contains device model, device OS, software version, device state (e.g. battery level, signal strength, memory used, number of processes, etc.) for each event the time stamp, actor (i.e. CSR or End Customer), direction of data sent (i.e. device to Care Console, Care Console to device), action type, and value (e.g. text entry, application response, screen coordinates, key type, gesture, etc.) is included. In addition to the device state and event information, the device screen snapshot and video streams are also recorded with time stamps. Each event can have associated device screen snapshot and video stream.

The specific events that are recorded, but not limited to, include:

a. Peer connect
b. Peer disconnect
c. Device remote image display start on the Remote Control Console
d. Device remote image display end on the Remote Control Console
e. Authentication—end customer PIN entry
f. Access attempt to an application on the Access Control List (ACL)
g. Access attempt to an application on the Black List
h. Access request to an application in the ACL (ACL Request)
i. End customer response to Access request (Accept or Reject)
j. Device Alert
k. Device Alert acknowledgment
l. Application Start
m. Application End
n. Application transition to background
o. Application transition to foreground
p. Key click on the device by the end customer
q. Key click on the device by the CSR on remote control console
r. Swipe or gesture on the device by the end customer
s. Swipe or gesture on the device by the CSR on remote control console
t. Application Start Request by the end customer
u. Application Execute request by the CSR
v. Application Execute request by the end customer
w. Text entry by the CSR
x. Text entry by the end customer
y. Device orientation change
z. Device radio access network change, e.g. 4G to 3G, 3G to 4G, cellular to wifi, etc.

Upon completion of the remote session the recorded information is stored on the Remote Session storage 23. Upon establishment of remote control session the event sequence is recorded and in real-time compared to the catalogued activity patterns in the Device Model Corrective Action Knowledgebase 52 for the device model that is being remotely controlled. As matching patterns are detected the problem symptom information with the recommended corrective actions are extracted from the Knowledgebase and presented to the CSR. As remote control session continues the patterns may be further filtered down due to nature of the activities are being performed.

During the remote control session the CSR may select one of the presented corrective actions. The actions taken by the CSR may have a positive (i.e. issue resolved) or negative (i.e. issue not resolved) result on the device. The result is recorded for the specific activity with the corresponding result. Where this result is stored with the event recording to enable the ranking of the corrective action at a later processing stage.

At the completion of the remote control session after the remote session event data is saved in Remote Session storage 23, based on the system configuration a workflow can be initiated automatically to analyze recorded events either for that specific device or across all the unprocessed recordings. Based on the analyzed actions and results obtained from these actions the pattern is classified for the specific device model.

As more data is collected and processed, pattern recognition technique used enables per session actions to be classified. The classifications of these patterns are ranked based on the number of occurrences and the results obtained across all the remote sessions recorded.

The ranked results are reviewed by the subject matter experts to indicate if the pattern is valid, a solution exists or a new solution has to be researched. If a solution exists then the pattern is linked with the solution. The ranked results with the solution are promoted to the Care knowledgebase for the specific model. During a remote session the ranked solutions from the knowledgebase are presented for the specific device model. Based on the current remote session customer complaint the CSR would select the specific classified pattern knowledge based entry to provide the end customer the appropriate recommendation.

Referring to FIG. 11, depicted is an exemplary system of a remote control session activity pattern recognition and solution recommendation. The system consists of a Mobile Device under remote control 10, the Remote Control Management System 20, Remote Session Activity Recording database, Remote Session Activity Pattern Recognition and Ranking process 40, Solution Identification from Ranked Activity Patterns 50, and Device Model Corrective Action Knowledgebase.

The interfaces between system components include: Remote Control Link 30—the established secure data link between the mobile device and the remote control management system; Remote Control Session Activity Recording Data Interface 21—the data interface from the Remote Control Management system to the Session Recording database or file system; Device Model Corrective Action Knowledgebase Interfaces 51—the data interface that is exposed from the Device Model Corrective Action Knowledgebase.

The following typical steps are executed remote control session activity pattern recognition and solution recommendation. Note that not all steps are executed sequentially during the same remote control session, the steps 1 to 5 are executed for all the remote control sessions, the steps 6 to 8 can be initiated at any point time, steps 9 and 10 are executed during remote control session when the CSR wants to consult with the device model knowledgebase.

Operation follows the steps of:

1. Remote Session request is made from the Console 20 to a device 10
2. Session recording is initiated and indexed based on the device number, device model and time stamp
3. Session initiation request is recorded.
4. After this point all the activities performed on the device are sent to the remote control server to be displayed on the remote control console, and all the activities performed on the remote control console within the device display pane are sent to the device. All these activities are recorded.
5. During the remote session as events are recorded the event sequence pattern is searched within Device Model Corrective Action Knowledgebase 52 to identify existing solutions. If there are matches then the event pattern and corrective actions are extracted from the Knowledgebase to be presented on the Remote Control Console to the CSR. As CSR continues with the activities on the device the pattern search continues and matches may be further filtered.

6. Upon session termination the unique session activity recording is stored in the Remote Session storage 23.

7. Remote session activity pattern recognition process on the server is initiated based on system configuration, either at the completion of the remote control session or at specific event or time. This process reads the activity list for each session, filters the activities that are relevant to actions taken on the device, classifies the pattern and stores the classification with the patterns on the Device Model Corrective Action Knowledgebase.

8. After pattern recognition process is completed then ranking process is initiated. In this process patterns are grouped and ranked according to the number of occurrences for the specific device model.

9. The ranked patterns are analyzed by subject matter experts (SMEs) and if solution is identified then the Device Model Corrective Action Knowledgebase for the specific device model, and patterns are updated with a problem categorization and a solution entry by the SME.

10. When a remote control session is successfully established, the Remote Control Console retrieves the ranked list of activity patterns with solutions and presents the list on the Console.

11. During remote control session a CSR may select one of the common problems that have been observed and classified with its corresponding solutions. When a selection is made, then the solution is retrieved from the Device Model Corrective Action Knowledgebase with list of actions. If CSR performs the recommended action then the result (problem resolved or unresolved) is recorded by the CSR for the specific actions performed. This result is also stored on the Remote Session storage 23 to aid the ranking of the corrective action and to aid the SME in the recommended solution.

It is to be understood that while a certain form of the invention is illustrated, it is not to be limited to the specific form of arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments. Indeed, various modifications of the described modes for carrying out the invention which are obvious to those skilled in the art are intended to be within the scope of the following claim.

What is claimed is:

1. A remote control session activity pattern recognition method, the method comprising:
   requesting a remote session with a mobile device;
   initiating a recording session of the remote session;
   initiating remote session activity pattern matching at a predetermined time; and
   presenting an activity pattern with an associated corrective action on a console on a condition that the activity pattern with an associated corrective action exists.

2. The method according to claim 1, wherein at least one of a session initiation request, all activities performed on the mobile device during the remote session, and device screen snapshots and video streams from the mobile device during the remote session is recorded.

3. The method according to claim 2, wherein the activities include at least key clicks, swipes, rotations, application start, application stop, mobile device state, and signal strength.

4. The method according to claim 1, wherein the predetermined time is at a completion of the remote session.

5. The method according to claim 1, wherein the predetermined time is at real-time as activities are being recorded.

6. The method according to claim 4, further comprising:
   reading an activity list for each remote session;
   filtering the activities that are relevant to actions taken on the mobile device;
   classifying a pattern; and
   storing a classification with the pattern on a mobile device model corrective action knowledgebase.

7. The method according to claim 6, further comprising:
   grouping patterns; and
   ranking according to a number of occurrences for a specific mobile device model.

8. The method according to claim 7, further comprising:
   analyzing ranked patterns by subject matter experts (SMES); and
   updating the mobile device model corrective action knowledgebase for a specific mobile device model and pattern with a problem categorization and an associated correction action entry by the SMES on a condition that a corrective action is identified.

9. The method according to claim 8, further comprising:
   transmitting a ranked list of activity patterns with associated corrective actions to the console upon establishment of the remote session.

10. The method according to claim 9, further comprising:
    selecting one of common problems that have been observed and classified with associated corrective actions;
    retrieving a corrective action from the mobile device model corrective action knowledgebase with a list of actions; and
    recording a result on a condition that the associated corrective action is executed on the mobile device.

11. The remote control session activity pattern recognition method according to claim 10, further comprising:
    storing a recorded result with the activity to support the ranking of the corrective action.

12. The remote control session activity pattern recognition method according to claim 1, further comprising:
    indexing the recorded session based on a given parameter.

13. The remote control session activity pattern recognition method according to claim 12, wherein the given parameter is at least one of device number, device model and time stamp.

14. The remote control session activity pattern recognition method according to claim 1, wherein the remote session is end user initiated.

15. The remote control session activity pattern recognition method according to claim 1, wherein the remote session is console initiated.

16. A system for remote control session activity pattern recognition, comprising:
    a console configured to request a remote session with a mobile device;

the console configured to initiate a recording session of the remote session;

the console configured to initiate remote session activity pattern matching at a predetermined time; and the console configured to present an activity pattern with an associated corrective action on a condition that the activity pattern with an associated corrective action exists.

17. The system according to claim 16, wherein the predetermined time is at a completion of the remote session.

18. The system according to claim 16, wherein the predetermined time is at real-time as activities are being recorded.

19. The system according to claim 16, further comprising:

an activity pattern recognition entity configured to read an activity list for each remote session from a database;

the activity pattern recognition entity configured to filter the activities that are relevant to actions taken on the mobile device;

the activity pattern recognition entity configured to classify a pattern; and the activity pattern recognition entity configured to store a classification with the pattern on a mobile device model corrective action knowledgebase.

20. The system according to claim 19, further comprising:

the activity pattern recognition entity configured to group patterns; and the activity pattern recognition entity configured to rank according to a number of occurrences for a specific mobile device model.

21. The system according to claim 20, further comprising:

an identification entity configured to work with subject matter experts (SMES) to analyze ranked patterns and determine the corrective actions; and the identification entity configured to update the mobile device model corrective action knowledgebase for a specific mobile device model and pattern with a problem categorization and an associated correction action entry by the SMES on a condition that a corrective action is identified.

22. The system according to claim 21, further comprising:

the console configured to transmit a ranked list of activity patterns with associated corrective actions to the mobile device upon establishment of the remote session.

23. The system according to claim 22, further comprising:

the console configured to select one of common problems that have been observed and classified with associated corrective actions;

the console configured to retrieve the associated corrective action from the mobile device model corrective action knowledgebase with a list of actions; and the console configured to record a result on a condition that the associated corrective action is executed on the mobile device.

24. The system according to claim 23, further comprising:

the console configured to store a recorded result with the activity to support the ranking of the corrective action in the database.

25. The system according to claim 16, wherein the remote session is end user initiated.

26. The system according to claim 16, wherein the remote session is console initiated.

\* \* \* \* \*